US009794299B2

(12) United States Patent
Votaw et al.

(10) Patent No.: US 9,794,299 B2
(45) Date of Patent: *Oct. 17, 2017

(54) PASSIVE BASED SECURITY ESCALATION TO SHUT OFF OF APPLICATION BASED ON RULES EVENT TRIGGERING

(71) Applicant: BANK OF AMERICA CORPORATION, Charlotte, NC (US)

(72) Inventors: Elizabeth S. Votaw, Potomac, MD (US); Alicia C. Jones-McFadden, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,951

(22) Filed: Mar. 16, 2017

(65) Prior Publication Data
US 2017/0187754 A1  Jun. 29, 2017

Related U.S. Application Data

(63) Continuation of application No. 14/928,154, filed on Oct. 30, 2015, now Pat. No. 9,641,539.

(51) Int. Cl.
H04L 9/00 (2006.01)
H04L 29/06 (2006.01)
(Continued)

(52) U.S. Cl.
CPC .......... *H04L 63/205* (2013.01); *G06F 21/629* (2013.01); *H04W 12/08* (2013.01)

(58) Field of Classification Search
CPC ..... H04L 63/205; H04W 12/08; G06F 21/629
See application file for complete search history.

(56) References Cited

U.S. PATENT DOCUMENTS 3,256,670 A  6/1966  Tersigni
3,651,168 A  3/1972  Stoessel et al.
(Continued)

OTHER PUBLICATIONS

QThru.com. "QThru: use your mobile smartphone for self-checkout." http://www.qthru.com/ QThru.com 2011. 6 pages. Retrieved Mar. 22, 2011.
(Continued)

*Primary Examiner* — Beemnet Dada
(74) *Attorney, Agent, or Firm* — Michael A. Springs; Moore & Van Allen PLLC; Nicholas C. Russell

(57) ABSTRACT

Embodiments of the invention are directed to a system, method, or computer program product for a passive based security escalation to shut off of applications on a mobile device based on rules. As such, the system may identify, via extraction of data, time periods correlating to events that the user may be offline or inactive with respect to his/her mobile device. Once the time periods are identified, rules are created for the level of security escalation required based on the event. Subsequently, a trigger is identified at a time leading up to the event, where the system integrates with the mobile device and requires additional authentication to access one or more applications. Once the offline event starts, the system initiates a shutdown of the functions of one or more applications on the user's mobile device. The system then reinstates the application functionality after the offline event has ended.

18 Claims, 5 Drawing Sheets

(51) Int. Cl.
  *G06F 21/62* (2013.01)
  *H04W 12/08* (2009.01)

(56) References Cited

U.S. PATENT DOCUMENTS

| | | |
|---|---|---|
| 5,437,346 A | 8/1995 | Dumont |
| 6,256,670 B1 | 7/2001 | Davies |
| 6,651,168 B1 | 11/2003 | Kao et al. |
| 7,111,323 B1 | 9/2006 | Bhatia et al. |
| 7,231,202 B2 | 6/2007 | Natsuno |
| 7,239,226 B2 | 7/2007 | Berardi et al. |
| 7,373,515 B2 | 5/2008 | Owen et al. |
| 7,472,081 B1 | 12/2008 | Cason |
| 7,529,741 B2 | 5/2009 | Aravamudan et al. |
| 7,546,276 B2 | 6/2009 | Randle et al. |
| 7,599,287 B2 | 10/2009 | Testa et al. |
| 7,627,505 B2 | 12/2009 | Yoshida et al. |
| 7,693,771 B1 | 4/2010 | Zimmerman et al. |
| 7,697,920 B1 | 4/2010 | McClain |
| 7,698,443 B2 | 4/2010 | Yaffe et al. |
| 7,716,180 B2 | 5/2010 | Vermeulen et al. |
| 7,738,382 B2 | 6/2010 | Le Faucheur et al. |
| 7,783,281 B1 | 8/2010 | Cook et al. |
| 7,930,264 B2 | 4/2011 | Geppert |
| 7,988,045 B2 | 8/2011 | Connell, II et al. |
| 8,012,219 B2 | 9/2011 | Mendez et al. |
| 8,156,335 B2 | 4/2012 | Lin |
| 8,165,945 B2 | 4/2012 | Collins et al. |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,261,093 B1 | 9/2012 | Dhesi et al. |
| 8,270,995 B2 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,332,272 B2 | 12/2012 | Fisher |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,412,626 B2 | 4/2013 | Hirson et al. |
| 8,423,466 B2 | 4/2013 | Lanc |
| 8,442,915 B2 | 5/2013 | Takatori et al. |
| 8,483,194 B1 | 7/2013 | Wu et al. |
| 8,483,663 B1 | 7/2013 | Jones |
| 8,485,438 B2 | 7/2013 | Dollard |
| 8,601,602 B1 | 12/2013 | Zheng |
| 8,644,506 B2 | 2/2014 | Zellner |
| 8,660,358 B1 | 2/2014 | Bergboer et al. |
| 8,682,802 B1 | 3/2014 | Kannanari |
| 8,683,571 B2 | 3/2014 | Zapata et al. |
| 8,744,968 B1 | 6/2014 | Grigg et al. |
| 8,768,838 B1 | 7/2014 | Hoffman |
| 8,769,270 B2 | 7/2014 | Orsini et al. |
| 8,850,575 B1 | 9/2014 | Magi Shaashua et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,973,102 B2 | 3/2015 | Jakobsson |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0045328 A1 | 3/2003 | Natsuno |
| 2003/0065805 A1 | 4/2003 | Barnes, Jr. |
| 2006/0030333 A1 | 2/2006 | Ward et al. |
| 2006/0036868 A1 | 2/2006 | Cicchitto |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0250920 A1 | 10/2007 | Lindsay |
| 2007/0277232 A1 | 11/2007 | Cates et al. |
| 2008/0167965 A1 | 7/2008 | Von Nothaus et al. |
| 2008/0293397 A1 | 11/2008 | Gajdos et al. |
| 2008/0319889 A1 | 12/2008 | Hammad |
| 2009/0019534 A1 | 1/2009 | Bakshi et al. |
| 2009/0076965 A1 | 3/2009 | Elson et al. |
| 2009/0100529 A1 | 4/2009 | Livnat et al. |
| 2009/0150286 A1 | 6/2009 | Barton |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0254975 A1 | 10/2009 | Turnbull et al. |
| 2010/0016001 A1* | 1/2010 | Yang ............... H04W 4/12 455/466 |
| 2010/0048167 A1* | 2/2010 | Chow ............... H04L 29/12594 455/410 |
| 2010/0064345 A1 | 3/2010 | Bentley et al. |
| 2010/0100897 A1 | 4/2010 | Manuel-Devadoss |
| 2010/0122333 A1 | 5/2010 | Noe |
| 2010/0330958 A1 | 12/2010 | Corda et al. |
| 2011/0016534 A1 | 1/2011 | Jakobsson et al. |
| 2011/0099104 A1 | 4/2011 | Nybom |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert et al. |
| 2011/0167440 A1 | 7/2011 | Greenfield |
| 2011/0208601 A1 | 8/2011 | Ferguson et al. |
| 2011/0270618 A1 | 11/2011 | Banerjee et al. |
| 2011/0320296 A1 | 12/2011 | Edwards |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0137340 A1 | 5/2012 | Jakobsson et al. |
| 2012/0144468 A1 | 6/2012 | Pratt et al. |
| 2012/0160912 A1 | 6/2012 | Laracey |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0197743 A1 | 8/2012 | Grigg et al. |
| 2012/0197794 A1 | 8/2012 | Grigg et al. |
| 2012/0230539 A1 | 9/2012 | Calman et al. |
| 2012/0239576 A1 | 9/2012 | Rose et al. |
| 2012/0254941 A1 | 10/2012 | Levien et al. |
| 2012/0254943 A1 | 10/2012 | Li |
| 2012/0265585 A1 | 10/2012 | Muirbrook et al. |
| 2012/0300938 A1 | 11/2012 | Kean et al. |
| 2012/0316963 A1 | 12/2012 | Moshfeghi |
| 2013/0007874 A1 | 1/2013 | Purvis |
| 2013/0013498 A1 | 1/2013 | Fisher et al. |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0042314 A1 | 2/2013 | Kelley |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0111208 A1 | 5/2013 | Sabin et al. |
| 2013/0143621 A1 | 6/2013 | Kumaran |
| 2013/0160100 A1* | 6/2013 | Langley ............... H04L 63/126 726/7 |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179954 A1 | 7/2013 | Bidare |
| 2013/0188485 A1 | 7/2013 | Midani et al. |
| 2013/0198056 A1 | 8/2013 | Aldrey et al. |
| 2013/0212007 A1 | 8/2013 | Mattsson et al. |

(56) References Cited

U.S. PATENT DOCUMENTS

| | | |
|---|---|---|
| 2013/0219454 A1 | 8/2013 | Hewinson |
| 2013/0267204 A1 | 10/2013 | Schultz et al. |
| 2013/0290361 A1 | 10/2013 | Anderson et al. |
| 2014/0129357 A1 | 5/2014 | Goodwin |
| 2014/0130127 A1 | 5/2014 | Toole et al. |
| 2014/0172707 A1 | 6/2014 | Kuntagod et al. |
| 2014/0173704 A1 | 6/2014 | Adams et al. |
| 2014/0208401 A1 | 7/2014 | Balakrishnan et al. |
| 2014/0244503 A1 | 8/2014 | Sadlier |
| 2014/0245391 A1 | 8/2014 | Adenuga |
| 2014/0250009 A1 | 9/2014 | Carlson |
| 2014/0279270 A1 | 9/2014 | Bertanzetti et al. |
| 2014/0279476 A1 | 9/2014 | Hua |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2015/0032621 A1 | 1/2015 | Kar et al. |
| 2015/0039601 A1 | 2/2015 | Harrang et al. |
| 2015/0120572 A1 | 4/2015 | Slade |
| 2015/0161610 A1 | 6/2015 | Sahadevan et al. |
| 2015/0171049 A1 | 6/2015 | Wasserman et al. |
| 2015/0213474 A1 | 7/2015 | Howe |

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout-Smartphone-App. "http://risnews.edgl.com/retail-news/Supermarket-Retailer-Rolls-Out-Self-Checkout-Smartphone-App81027 2 pages. Retrieved Mar. 9, 2013.

Zimmerman, Ann. "Check Out the Future of Shopping: Shaving Time Off the Weekly Grocery Run to Keep Consumers in Stores and Shopping." http://online.wsj.com/article/SB10001424052748703421204576329253050637400.html. 5 pages. Retrieved Mar. 22, 2013.

* cited by examiner

PASSIVE BASED SECURITY ESCALATION TO SHUT OFF OF APPLICATION BASED ON RULES EVENT TRIGGERING

CROSS-REFERENCE TO RELATED APPLICATION(S)

This application is a continuation application of U.S. patent application Ser. No. 14/928,154 filed Oct. 30, 2015, entitled "PASSIVE BASED SECURITY ESCALATION TO SHUT OFF OF APPLICATION BASED ON RULES EVENT TRIGGERING," the contents of which are hereby incorporated by reference.

BACKGROUND

Advancements in technology have made mobile devices with multi-faceted functionality available to large numbers of individuals. With the continued addition of new functions to these mobile devices, more and more information about the individuals that own the device is being carried on the mobile device. In this way, security of the mobile device has been important, providing key locks and password protection to the information stored on the mobile device.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for providing a passive based security escalation to shut off of applications on a mobile device based on rules event triggering. As such, the system may identify, passively, via extraction of data such as social media data, transaction data, or the like, time periods that the user may be offline or inactive with respect to his/her mobile device. These periods may include when the user is on a flight, in a meeting, in class, traveling abroad, or the like. Once these time periods are identified, information about the time period and the time leading up to and after the offline time period may be identified. As such, for example, if the user is on a flight, the time leading up to the flight and after the flight, the user may be in the airport or another public place. The identification of the offline time and information about the time leading up to and after the offline time period may all lead to the system generation of rules associated with each specific case. In some embodiments, the generated rules may include one or more security escalations to a single application, one or more security escalations to multiple applications, application functionality shut downs, or the like based on the location of the user during the leading and trailing time as well as the offline time period.

In this way, the system may identify a time period of inactivity or offline status for the user in the future. In order to prevent any misappropriation of the data on the user's device during the offline time period, the system may integrate a passive based security escalation to shut off for the time leading up to the offline time period, the offline time period, and the time directly after the time period.

Once the offline time period is approaching, the system may trigger the passive based security escalation based on determined rules for the specific offline time period. In this way, in some embodiments, the system may initiate the security escalation by increasing mobile application security in a time frame leading up to the offline period. In some embodiments, the security escalation may target specific applications, such as financial applications or applications with personal information associated therewith. In some embodiments, the security escalation may apply to all applications. The security escalation may require a user to input additional security information prior to allowing the application functionality.

Next, once the offline time period has begun, the system may shut down one or more applications based on the rules. In this way, the user has the additional security of the application being shut down and thus, no one has the ability to access the applications or user data for misappropriation. In some embodiments, the system may shut down all applications associated with the user's mobile device. In some embodiments, the system may shut down specific applications, such as financial applications or applications with personal information associated therewith. In some embodiments, the user may be able to override the shutdown of the applications via security authorization if needed.

Finally, after the offline time period has expired, the system may restore the application functionality. In some embodiments, the system may, for a predetermined period of time after the offline period, continue to include escalated security for one or more applications. In some embodiments, the security escalation may target specific applications, such as financial applications or applications with personal information associated therewith. In some embodiments, the security escalation may apply to all applications. The security escalation may require a user to input additional security information prior to allowing the application functionality.

Embodiments of the invention relate to a system for passive based security escalation implementation. The system comprises a memory device with a security application stored thereon; a communication device in operative communication with a communication device associated with a user device over a network; and a processing device operatively coupled to the memory device and the communication device. The security application, when executed by the processing device, causes the processing device to determine an offline period of time for the user device; generate a security escalation plan for the user device, wherein the security escalation plan comprises a set of rules for security during the offline period of time, wherein the set of rules for security during the offline period of time comprises rules for initiating a shutdown of one or more applications on the user device; and integrate, over the network, the security escalation plan into a user application on the user device, wherein the user application, when executed by a processor associated with the user device, causes the processor to implement the security escalation plan.

In some embodiments, the security escalation plan further comprises a second set of rules for security before the offline period of time, wherein the second set of rules for security before the offline period of time comprises rules to increase security requirements for accessing the one or more applications on the user device based on a triggering of a time period leading up to the offline period of time.

In some embodiments, the security escalation plan further comprises a third set of rules for security after the offline period of time, wherein the third set of rules for security after the offline period of time comprises rules for restoring functionality of the one or more applications on the user device based on a triggering of a time period after the offline period of time.

In some embodiments, the third set of rules for security further comprise rules for restoring standard security requirements for the one or more applications on the user device.

In some embodiments, determining an offline period of time for the user device is accomplished by the security application further causing the processing device to extract historical user data associated with a user from one or more external sources and identify, from the historical user data, an indication of the offline period of time for the user device, wherein the indication of the offline period of time comprises one or more events that the user is attending at a future time.

In some embodiments, a user may override the shutdown of the one or more applications on the user device via security authorization.

Embodiments of the present invention also relate to a computer program product for passive based security escalation implementation, the computer program product comprising at least one non-transitory computer-readable medium having computer-readable program code portions embodied therein. The computer-readable program code portions comprise an executable portion configured for determining an offline period of time for a user device; an executable portion configured for generating a security escalation plan for the user device, wherein the security escalation plan comprises a set of rules for security during the offline period of time, wherein the set of rules for security during the offline period of time comprises rules for initiating a shutdown of one or more applications on the user device; an executable portion configured for integrating, over a network, the security escalation plan into a user application; and an executable portion configured for implementing the security escalation plan.

In some embodiments, the security escalation plan further comprises a second set of rules for security before the offline period of time, wherein the second set of rules for security before the offline period of time comprises rules for increasing security requirements for accessing the one or more applications on the user device based on a triggering of a time period leading up to the offline period of time.

In some embodiments, the security escalation plan further comprises a third set of rules for security after the offline period of time, wherein the third set of rules for security after the offline period of time comprises rules for restoring functionality of the one or more applications on the user device based on a triggering of a time period after the offline period of time.

In some embodiments, the third set of rules for security further comprise rules for restoring standard security requirements for the one or more applications on the user device.

In some embodiments, the computer readable program code portions further comprise an executable portion configured for extracting historical user data associated with a user from one or more external sources and an executable portion configured for identifying, from the historical user data, an indication of the offline period of time for the user device, wherein the indication of the offline period of time comprises one or more events that the user is attending at a future time.

In some embodiments, a user may override the shutdown of the one or more applications on the user device via security authorization.

Embodiments of the present invention also relate to a computer-implemented method for passive based security escalation implementation. The method comprises determining an offline period of time for a user device; generating a security escalation plan for the user device, wherein the security escalation plan comprises a set of rules for security during the offline period of time, wherein the set of rules for security during the offline period of time comprises rules for initiating a shutdown of one or more applications on the user device; integrating, over a network, the security escalation plan into a user application; and implementing the security escalation plan.

In some embodiments, the security escalation plan further comprises a second set of rules for security before the offline period of time, wherein the second set of rules for security before the offline period of time comprises rules for increasing security requirements for accessing one or more applications on the user device based on a triggering of a time period leading up to the offline period of time.

In some embodiments, the security escalation plan further comprises a third set of rules for security after the offline period of time, wherein the third set of rules for security after the offline period of time comprises rules for restoring functionality of the one or more applications on the user device based on a triggering of a time period after the offline period of time.

In some embodiments, the third set of rules for security further comprise rules for restoring standard security requirements for the one or more applications on the user device.

In some embodiments, the method further comprises extracting historical user data associated with a user from one or more external sources and identifying, from the historical user data, an indication of the offline period of time for the user device, wherein the indication of the offline period of time comprises one or more events that the user is attending at a future time.

In some embodiments, a user may override the shutdown of the one or more applications on the user device via security authorization.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
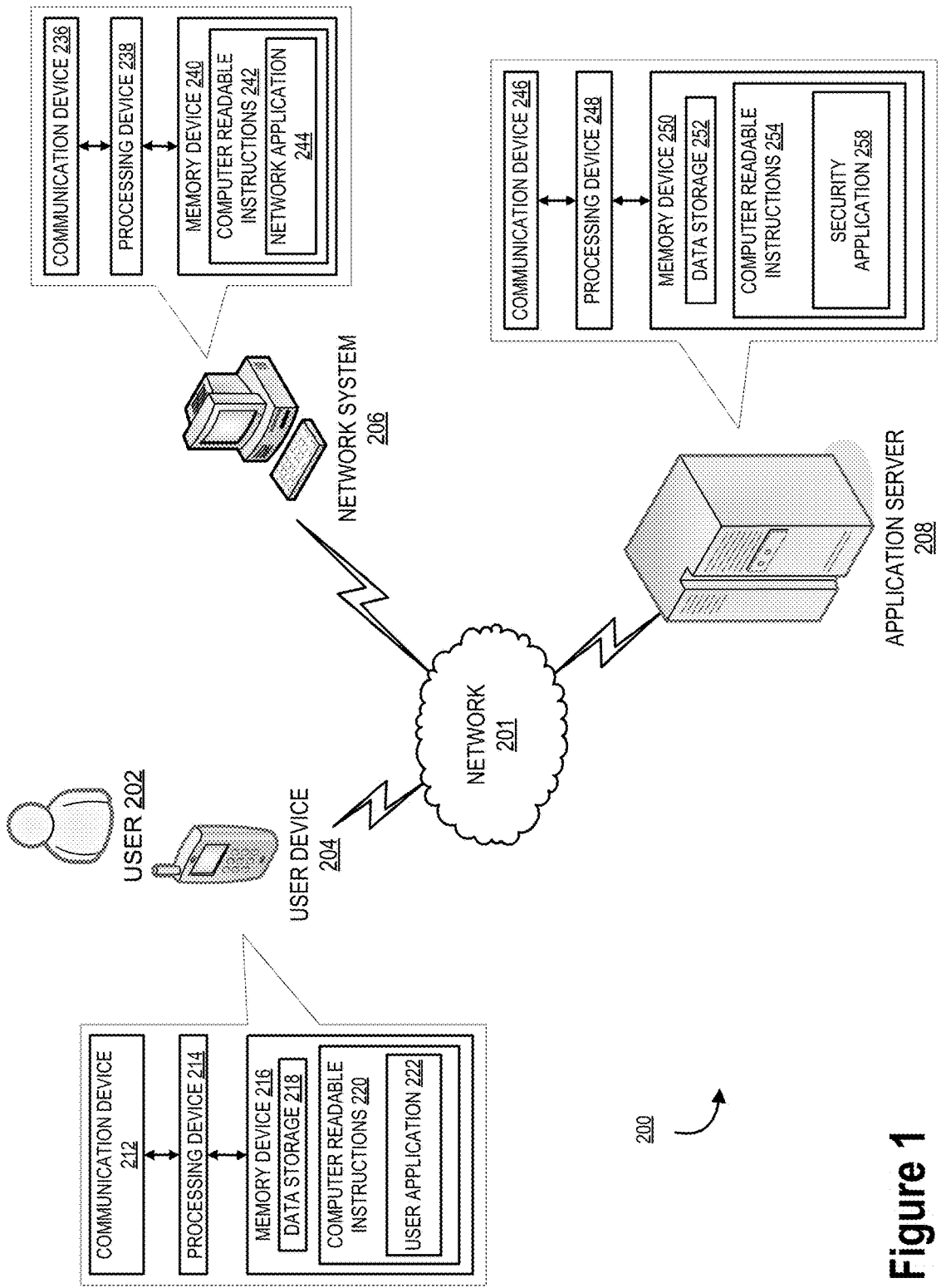
Figure 2:
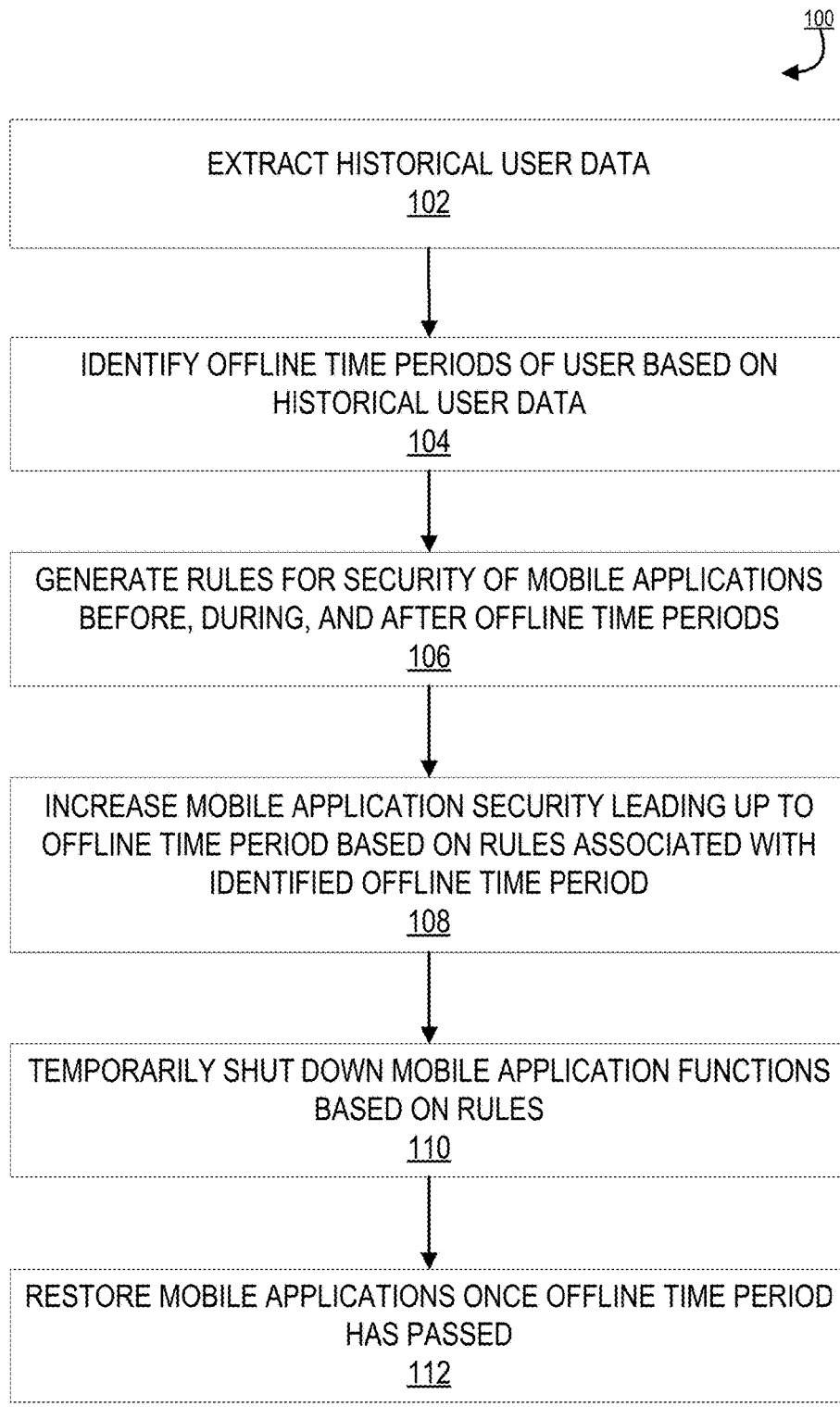
Figure 3:
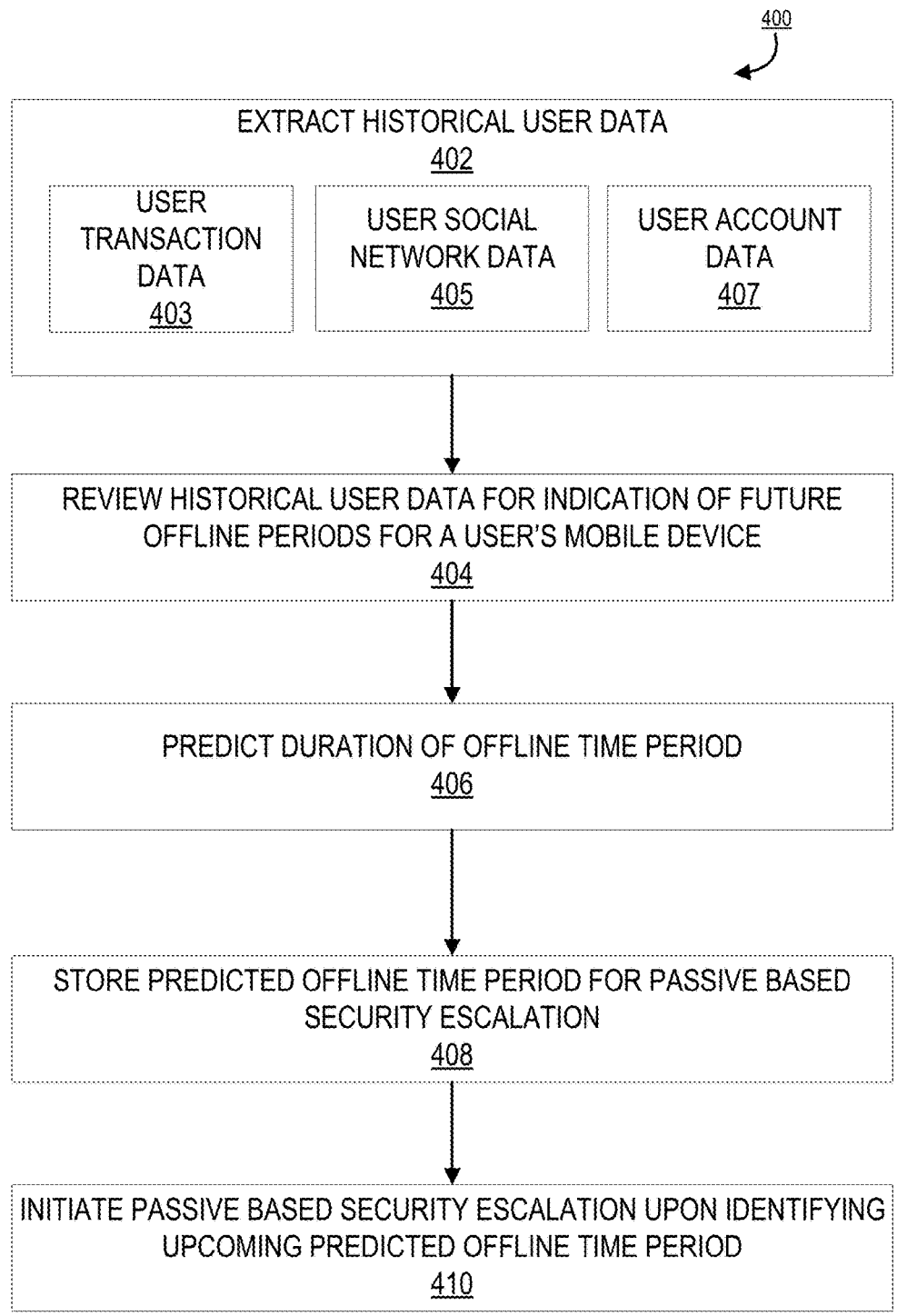
Figure 4:
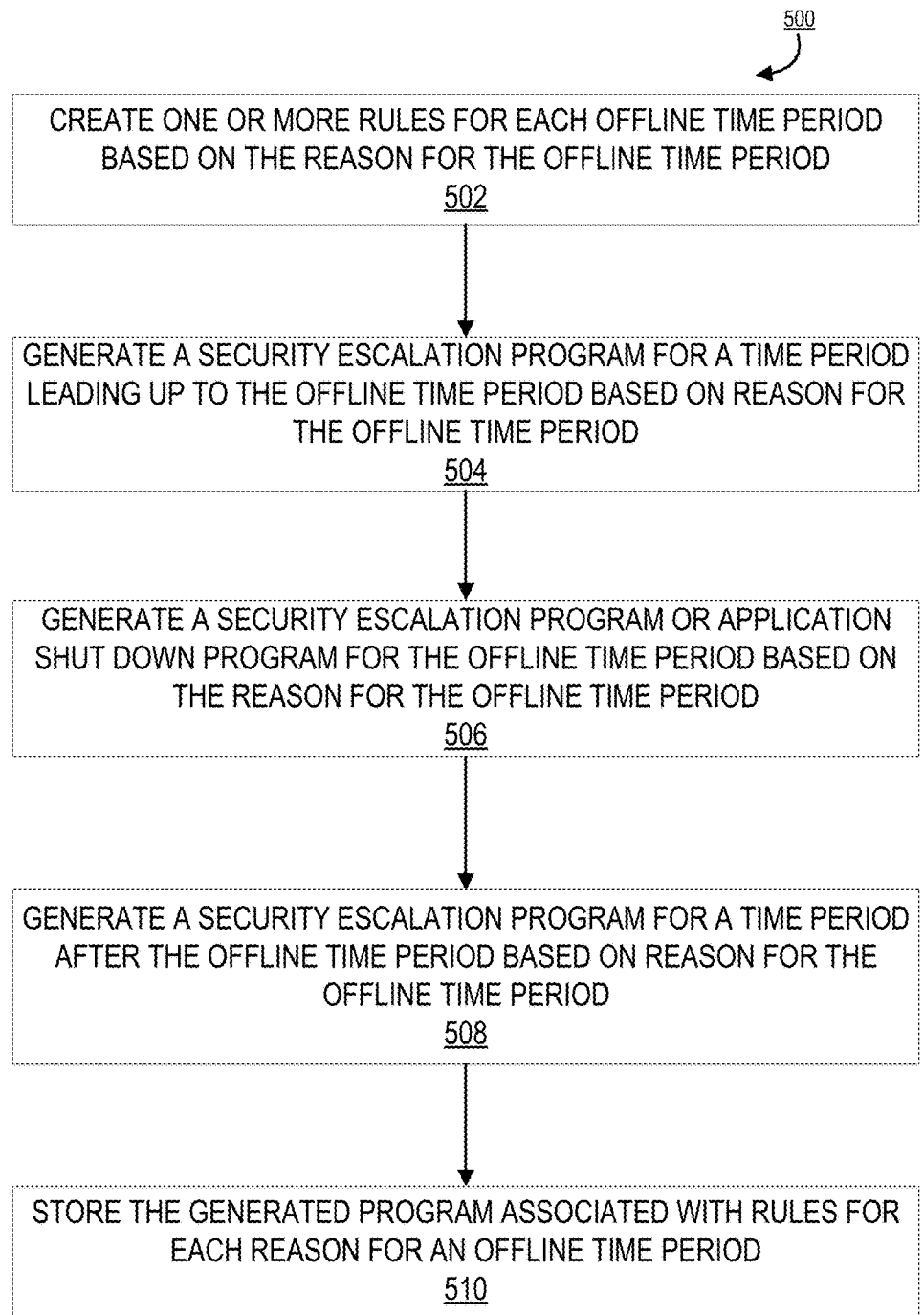
Figure 5:
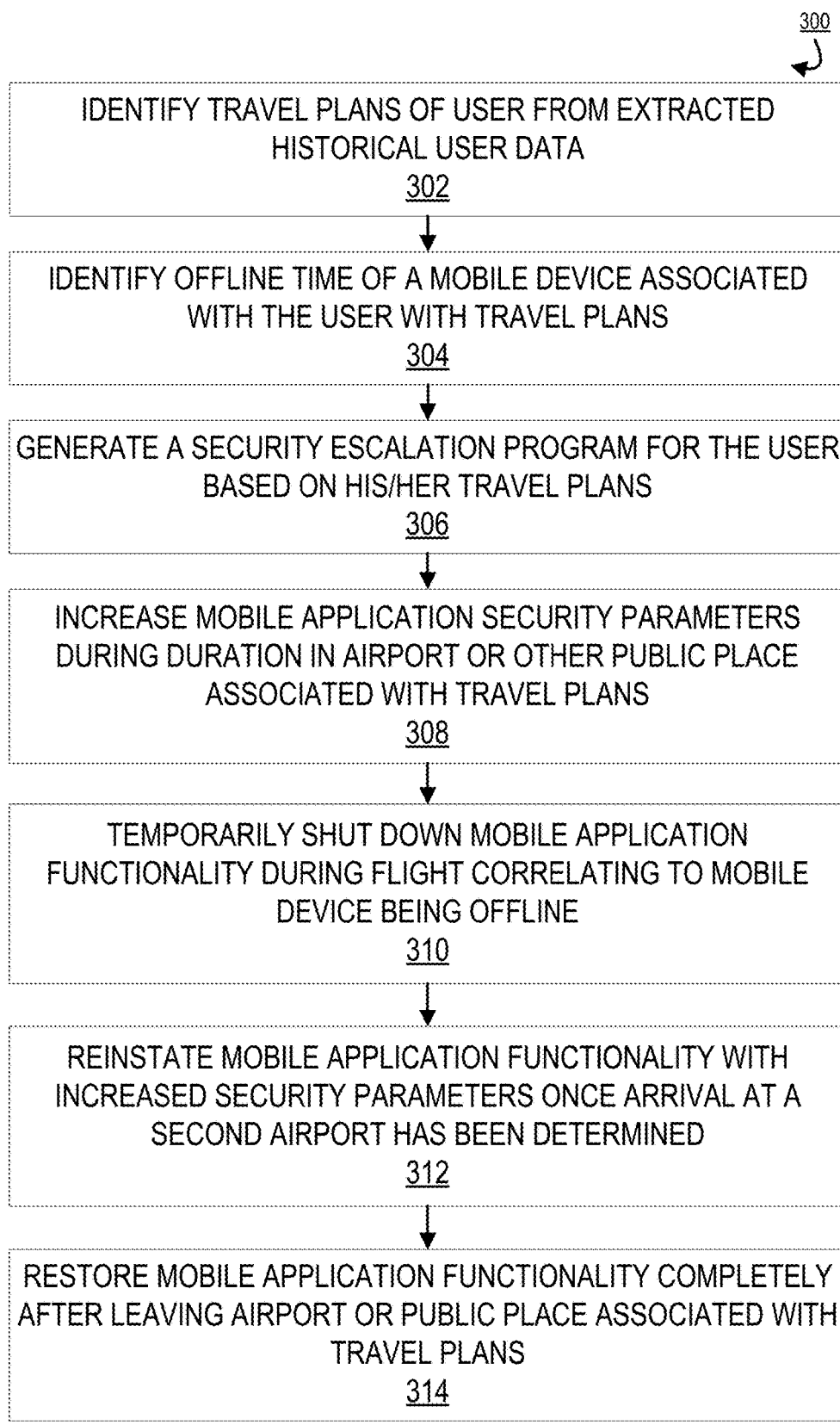

Having thus described embodiments of the invention in general terms, reference will now be made to the accompanying drawings, wherein:

FIG. 1 provides a passive based security escalation system environment, in accordance with one embodiment of the present invention;

FIG. 2 provides a high level process flow illustrating the passive based security escalation process, in accordance with one embodiment of the present invention;

FIG. 3 provides a process map illustrating extracting historical data for the passive based security escalation system, in accordance with one embodiment of the present invention;

FIG. 4 provides a process map illustrating generating rules for the passive based security escalation system, in accordance with one embodiment of the present invention; and FIG. 5 provides a process map illustrating an example of the passive based security escalation system, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

With advancements in technology infrastructures and wireless communication implementation, portable multifunction devices, such as laptop computers, tablet computers, mobile phones and the like are common. Typically, individuals may have a user device on them when in public. These devices have the capability to hold large amounts of information, including personal information. Misappropriation of these devices may cause the transfer of personal information from one individual to another.

Embodiments of the present invention address the above needs and/or achieve other advantages by providing apparatuses (e.g., a system, computer program product and/or other devices) and methods for providing a passive based security escalation to shut off of applications on a mobile device based on rules event triggering. As such, the system may identify, passively, via extraction of data such as social media data, transaction data, or the like, time periods that the user may be offline or inactive with respect to his/her mobile device. These periods may include when the user is on a flight, in a meeting, in class, traveling abroad, or the like. Once these time periods are identified, information about the time period and the time leading up to and after the offline time period may be identified.

In this way, if a mobile device or information on the mobile device is accessed without authorization while a user is offline, the system may prevent the access, thus preventing misappropriation of the information on the device.

Embodiments of the invention are directed to a system, method, or computer program product for a distributive network system with specialized data feeds associated with the distributive network and specific triggering events associated with the data feeds for coding and generating a passive based security escalation to shut off system for application security on a mobile device. Thus, the system may communicate with, store, and execute code on a mobile device for completion of the security speculation programs. Furthermore, the system may manipulate and transform currently stored applications on a user device for passive security escalation.

FIG. 1 illustrates a passive based security escalation system environment, in accordance with one embodiment of the present invention 200, in accordance with one embodiment of the present invention. FIG. 1 provides the system environment 200 for which the distributive network system with specialized data feeds associated with the distributive network and specific triggering events associated with the data feeds for passive based security escalation associated with applications on a user mobile device.

FIG. 1 provides a unique system that includes specialized servers and system communicably linked across a distributive network of nodes required to perform the functions of identifying applications on a user device, identifying offline time periods for a user, initiating a rules based security escalation program for one or more applications on a user's mobile device based on the offline time periods, and imputing security escalation or application shut off for the time periods identified. Furthermore, in some embodiments, the system may be, as described below, run on a diffusion network of specialized nodes meant for passive based security escalation.

As illustrated in FIG. 1, the application server 208 is operatively coupled, via a network 201 to the user system 204, and to the network system 206. In this way, the application server 208 can send information to and receive information from the user device 204 and the network system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has a user device, such as a mobile phone, tablet, or the like. FIG. 1 also illustrates a user system 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is a computing system that allows a user 202 to interact through the network 201 with the application server 208 to request an identifier, authorize the storage of the identifier on the user device 204, and to activate the identifier. The processing device 214 is operatively coupled to the communication device 212 and the memory device 216. The processing device 214 uses the communication device 212 to communicate with the network 201 and other devices on the network 201, such as, but not limited to the network system 206 and the application server 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

In some embodiments, the user application 222 allows a user 202 to activate and utilize applications via the user device 204. Furthermore, the user application 222 allows the user to sign onto using the passive based security system. In this way, the user application 222 may allow the user to accept and log into using the passive based security system for securing the applications on the user device 204 associated with the user 204. Furthermore, the user application 222 allows a user to input additional security authentications at the user device 204 to allow activation of the applications that are part of the security escalation program generated by the system.

As further illustrated in FIG. 1, the application server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the network system 206 and the user system 204. As such, the communication device 246 generally comprises a modem, server, or other device for communicating with other devices on the network 201.

As further illustrated in FIG. 1, the application server 208 comprises computer-readable instructions 254 stored in the memory device 250, which in one embodiment includes the computer-readable instructions 254 of a security application 258. In some embodiments, the memory device 250 includes data storage 252 for storing data related to the system environment, but not limited to data created and/or used by the security application 258.

In the embodiment illustrated in FIG. 1 and described throughout much of this specification, the security application 258 may extract historical user data, identify one or more offline time periods for a user's user device 204, generate a security escalation program, and activate the security escalation program on the user device 204 based on a trigger.

In some embodiments, the security application 258 may extract historical user data. The historical user data extracted by the security application 258 may include user transaction data, user social network data, and/or user account data. User transaction data comprises data associated with financial institution accounts, payment accounts, or the like that may provide information about transactions the user 202 may have completed with a credit card, debit card, or the like. As such, the security application 258 may request or extract transaction data via the network 201. User social networking data is extracted by the security application 258 from social networking sites and includes accessing and extracting information from user social networking sites that may provide an indication of a user 202 being offline from a mobile device for a period of time. User account data is extracted from one or more payment accounts, merchant accounts, rewards accounts, frequent flier accounts, or the like that the user 202 has set up that may provide an indication of one or more offline period.

In some embodiments, the security application 258 may identify one or more offline time periods for a user's user device 204. As such, the security application 258 reviews the historical user data for indications of future offline periods for a user device 204. While the term historical user data is used throughout this application, one will appreciate that the data may be extracted from one or more sources in real-time or near real-time in order to provide the system with an up to date view of potential offline periods of the user device 204 in the future. In this way, the security application 258 reviews the data extracted from one or more sources to identify potential offline periods of time for the user device 204. These offline periods may include classes, flights, movies, events, plays, or the like that may provide an indication of one or more periods of offline time of the user and his/her mobile device. In some embodiments, the data identified by the security application 258 may specifically indicate the purchase of tickets, passes, or the like for an event that will be an offline period for the user device 204. In other embodiments, the data extracted and identified by the security application 258 may be ancillary data that the security application 258 may combine to provide a confidence level that a specific event will occur and the user device 204 will be offline.

In some embodiments, the security application 258 may generate a security escalation program. The program for each event requires the generation of rules for that event. The security application 258 may create the one or more rules for each even that is associated with an offline time period based on the identified reason for the offline time period. As such, the rules may be based on whether the offline time period requires true shut off of the user device 204 or a silencing of the user device 204. The security application 258 may generate rules for the time period leading up to the offline time period, the offline time period, and a time period after the offline time period. Once the rules are created for the specific event the security application 258 may be stored and utilized in the future for subsequent similar events for other users.

In some embodiments, the security application 258 generates a security escalation program for a time period leading up to the offline time period based on the reasons for the offline time period. As such, if the offline time includes potential security issues, such as being in a crowded public place, or the like prior to the offline period, the security application 258 may escalate security for one or more applications on the user device 204 during the period of time leading up to the offline period. In this way, the security application 258 may integrate into the user device 204 and may require additional security authorization to allow access to one or more applications on the user device 204. In some embodiments, the security escalation integrated from the security application 258 may target specific applications, such as financial applications or applications with personal information associated therewith. In some embodiments, the security escalation integrated from the security application 258 may apply to all applications. The security escalation may require a user 202 to input additional security information prior to allowing the application functionality.

In some embodiments, the security application 258 may generate a security escalation program or application shut down program for the offline time period based on the reasons for the offline time period. As such, if it is identified that the user device 204 is going to have an offline time period, such as during a flight, the security application 258 may shut down the functionality of one or more of the applications via integration into the user device 204. In some embodiments, the security application 258 may shut down all applications associated with the user device 204. In some embodiments, the security application 258 may shut down specific applications, such as financial applications or applications with personal information associated therewith associated with the user device 204. In some embodiments, the user 202 may be able to override the shutdown of the applications from the security application 258 via security authorization if needed.

In some embodiments, the security application 258 may generate a security escalation program for a time period after the offline time period based on reasons for the offline time period. As such, after the offline time period has expired, the security application 258 may restore the application functionality on the user device 204. In some embodiments, the security application 258 may, for a predetermined period of time after the offline period, continue to include escalated security for one or more applications. In some embodiments, the security escalation may target specific applications on the user device 204, such as financial applications or applications with personal information associated therewith. In some embodiments, the security escalation may apply to all applications on the user device 204. The security escalation may require a user 202 to input additional security information on the user device 204 prior to the security application 258 allowing the application functionality.

As illustrated in FIG. 1, the network system 206 is connected to the application server 208 and is associated with a mobile device network. In this way, while only one network system 206 is illustrated in FIG. 1, it is understood that multiple network systems may make up the system environment 200. The network system 206 generally comprises a communication device 236, a processing device 238, and a memory device 240. The network system 206 comprises computer-readable instructions 242 stored in the memory device 240, which in one embodiment includes the computer-readable instructions 242 of a network application 244.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a high level process flow illustrating the passive based security escalation process 100, in accordance with one embodiment of the present invention. As illustrated in block 102, the process 102 is initiated by extracting historical user data. This historical data may include transaction data, social networking data, or the like. Next, as illustrated in block 104, the process 100 continues by identifying potential offline periods of time the user may have in the future based on the historical user data. In this way, the system may identify based on user data, such as transaction data, social media data, or the like, potential future periods of time that the user may be offline with his/her mobile device. Offline periods may include flights, meetings, classes, or the like when a user may have his/her mobile device turned off. Identifying the offline periods includes identifying airline tickets purchased, books for classes, or the like via transaction data and/or reviewing social networking data for indications of vacations, meetings, or other indicators suggesting the user may have his/her mobile device turned off.

As illustrated in block 106, the system may generate rules for security of mobile applications before, during, and/or after the identified offline time periods. These rules may include a security level for before, during, and/or after the offline time period. For before and after the offline time period, the system may generate rules for requiring additional security authentication for one or more applications on the user's mobile device. For the offline time periods, the system may shut off functionality of one or more applications on the user's mobile device. In this way, in public places or while the user is not online with the mobile device, the user is provided additional misappropriation protection.

Once the rules are generated in block 106, the process 100 continues by increasing the mobile application security leading up to the offline time period based on the rules associated with the identified offline time period, as illustrated in block 108. In this way, some embodiments may require additional security authentication for one or more selected applications. In other embodiments, additional security authentication for all applications may be implemented.

As illustrated in block 110, the system may temporarily shut down the mobile application functions of one or more applications based on the rules. The applications may be shut off or shut down from access for the duration of the offline time period. As such, the system may not allow access from any location to applications on the mobile device during the offline period. Once, the system determines that the offline period is over based on a determination of the time frame of the offline time period based on the user historical data, the system may restore the mobile applications once the offline tie period has passed, as illustrated in block 112.

FIG. 3 illustrates a process map for extracting historical data for the passive based security escalation system 400, in accordance with one embodiment of the present invention. As illustrated in block 402, the process 400 is initiated by the system extracting historical user data. The historical user data extracted in block 402 may include user transaction data 403, user social network data 405, and user account data 407. In some embodiments, the user data may be user transaction data 403. User transaction data 403 comprises accessing and extracting information from financial institutions or the like that has information about transactions the user may have completed with a credit card, debit card, or the like. As such, the system may identify if the user has purchased books, airline tickets, or the like that may be associated with an offline time period of the user's mobile device. User social networking data 405 comprises accessing and extracting information from user social networking sites that may provide an indication of a user being offline from a mobile device for a period of time. User account data 407 is data extracted from one or more payment accounts, merchant accounts, rewards accounts, frequent flier accounts, or the like that the user has set up that may provide an indication of one or more offline periods. For example, a user may have an account with a movie theater for purchasing movie tickets, the system may identify the account and movies that the user may attend, thus leading to offline periods. In another example, the system may identify that the user has a frequent flyer account with an airline, based on this account the system may be able to identify one or more upcoming flights that the user may have, which will lead to offline time periods for the user during the flight.

Next, the process 400 continues when the system gathers the extracted historical user data from block 402 and reviews the historical user data for indications of future offline periods for a user's mobile devices, as illustrated in block 404. While the term historical user data is used throughout this application, one will appreciate that the data may be extracted from one or more sources in real-time or near real-time in order to provide the system with an up to date view of potential offline periods of the user in the future. In this way, the system may review the data extracted from one or more sources to identify potential offline periods of time for the user's mobile device. These offline periods may include classes, flights, movies, events, plays, or the like that may provide an indication of one or more periods of offline time of the user and his/her mobile device. In some embodiments, the data extracted may specifically indicate the purchase of tickets, passes, or the like for an event that will be an offline period for the user's mobile device. In other embodiments, the data extracted may be ancillary data that the system may combine to provide a confidence level that a specific event will occur and the user's mobile device will be offline. For example, ancillary data may include the purchase of books and school supplies from one source and a social networking trend indicating the user is attending a class or school. As such, in some embodiments, the data may be extracted from various sources, but be combined to provide a confidence that one or more of the events that may lead to an offline time period of the user's mobile device may occur.

As illustrated in block 406, once the system has reviewed the historical user data and identified future offline periods of a user's mobile device, the system may next predict the duration of the offline time period. In some embodiments, the system may use the data extracted to identify that a flight, event ticket or the like has been purchased. Subsequently, the system may access the airline or the event venue and determine a duration of the event such that the system may only initiate shut off of the application functionality during that event. Once the predicted offline time is identified and the time frame of the offline time is predicted, the system may store the data for passive based security escalation, as illustrated in block 408. The storing may include a triggering of the passive based security escalation at a specific time period prior to the offline time period. As such, as illustrated in block 410, the process 400 is completed by initiating the passive based security escalation upon identifying the upcoming predicted offline time period and/or a triggering time prior to the offline time period.

FIG. 4 illustrates a process map for generating rules for the passive based security escalation system 500, in accordance with one embodiment of the present invention. As illustrated in block 502, the process 500 is initiated by creating one or more rules for each offline time period based on the identified reason for the offline time period. As such, the rules may be based on whether the offline time period requires a true shut off of the mobile device or a silencing of the mobile device. In some embodiments, the offline time period may be a complete turn off of the mobile device, such as on a flight or the like. In some embodiments, the offline time period may be a period of inactivity when the mobile device may be silent, such as at an event, in a meeting, or the like. Furthermore, the rules may be based on how public the location is with respect to the offline time and/or the time leading up to the offline time.

Once the rules are created for the specific event they may be stored and utilized in the future for subsequent similar events for other users. Once created, the system may then generate a security escalation program for the event, thus for the time period leading up to the offline time period, the offline time period, and a time period after the offline time period.

As such, as illustrated in block 504, the process 500 continues by generating a security escalation program for a time period leading up to the offline time period based on the reasons for the offline time period. As such, if the offline time includes potential security issues, such as being in a crowded public place, or the like prior to the offline period, the system may escalate security for one or more applications on the mobile device during the period of time leading up to the offline period. In this way, the system may require additional security authorization to allow access to one or more applications with financial information, personal information, or the like. In some embodiments, the security escalation may target specific applications, such as financial applications or applications with personal information associated therewith. In some embodiments, the security escalation may apply to all applications. The security escalation may require a user to input additional security information prior to allowing the application functionality.

Next, as illustrated in block 506, the system may generate a security escalation program or application shut down program for the offline time period based on the reasons for the offline time period. As such, if the user is going to have an offline time period, such as during a flight, the system may shut down the functionality of one or more of the applications. Thus, once the offline time period has begun, the system may shut down one or more applications based on the rules. In this way, the user has the additional security of the application being shut down and thus, no one has the ability to access the applications or user data for misappropriation. In some embodiments, the system may shut down all applications associated with the user's mobile device. In some embodiments, the system may shut down specific applications, such as financial applications or applications with personal information associated therewith. In some embodiments, the user may be able to override the shutdown of the applications via security authorization if needed.

Next, as illustrated in block 508, the process 500 continues by generating a security escalation program for a time period after the offline time period based on reasons for the offline time period. Thus, after the offline time period has expired, the system may restore the application functionality. In some embodiments, the system may, for a predetermined period of time after the offline period, continue to include escalated security for one or more applications. In some embodiments, the security escalation may target specific applications, such as financial applications or applications with personal information associated therewith. In some embodiments, the security escalation may apply to all applications. The security escalation may require a user to input additional security information prior to allowing the application functionality.

Finally, as illustrated on block 510, the system may store the generated security escalation program for the event associated with the rules for each reason for an offline time period. In this way, the system may build a database of rules and escalation parameters for each of the potential events leading to an offline time period. The system may continually learn and adjust the security escalation programs for each event based on prior events and prior programs generated.

FIG. 5 illustrates a process map of an example of the passive based security escalation system 300, in accordance with one embodiment of the present invention. As illustrated in block 302, the process 300 is initiated by the identification of travel plans of the user from extracted historical user data. In this way, the system may have identified and extracted the data from a user account, such as a frequent flyer account or the like, user transaction history, such as credit card data from a financial institution, and/or from user social network data, such as from a post or blog from the user indicating travel plans. In some embodiments, one data source may have been used to identify travel plans of the user. In some embodiments, a combination of one or more data sources may have been used to identify travel plans of the user. Once identified, the system may generate a confidence score, indicating a confidence of the travel plans being authentic.

Next, once the travel plans of the user have been identified based on the historical user data, the system may identify the actual duration of offline time of a mobile device associated with the user, as illustrated in block 304. In this way, the system may reach out to external sources to determine a duration of the event leading to the offline time period. In this example, the system may reach out to the airlines to determine the duration of the flight of the user.

Once the system has identified that the user has travel plans associated with flying, where there is an offline period associated with the travel plans, such as being in the airplane in flight and once the system has identified the duration of those plans, the system may begin to map and generate a security escalation program for the travel, as illustrated in block 306. The security escalation program may include a selection of all or some applications for security escalation prior to and after the offline time period and a selection of all or some applications for security escalation or application shut off during the offline time period.

In the example illustrated in FIG. 5, the system may identify the time period the user may be at the airport prior to and after the flight. In this way, the system may identify security escalations that may require additional authorization or passwords for access to one or more applications on the user's mobile device while he/she is at the airport. The applications associated with the security escalation may include any that has financial or personal information about the user. In other embodiments, all applications on the mobile device may be associated with security escalations.

As illustrated in block 308, the process may continue by increasing mobile application security parameters during the user's time in the airport or other public place associated with the user's travel plans. As such, the system may require additional security authorization or password protection for accessing application functionality during time periods prior to the user's flight. The applications associated with the security escalation may include any that has financial or personal information about the user. In other embodiments, all applications on the mobile device may be associated with security escalations.

As illustrated in block 310, once the system is triggered that the offline period of time has begun, the system may temporarily shut down mobile application functionality during the flight. This application functionality that is shut down may be directed specifically to one or more mobile devices identified as being associated with the user and/or on the flight with the user.

Once the offline time period has passed, the system may reinstate mobile application functionality to the user's mobile device with increased security parameters, as illustrated in block 312. In this example process 300, once the system identifies that the user's airplane has landed at the second airport, the mobile application functionality is reinstated. In some embodiments, the system may, for a predetermined period of time after the offline period, continue to include escalated security for one or more applications. In some embodiments, the security escalation may target specific applications, such as financial applications or applications with personal information associated therewith. In some embodiments, the security escalation may apply to all applications. The security escalation may require a user to input additional security information prior to allowing the application functionality.

Finally, as illustrated in block 314, the process 300 is completed by restoring full mobile application functionality after the user has left the airport or public place associated with travel plans.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 14/928,332 | DETERMINING USER AUTHENTICATION BASED ON USER/DEVICE INTERACTION | Oct. 30, 2015 |
| 14/928,360 | DETERMINING USER AUTHENTICATION BASED ON USER PATTERNS WITHIN APPLICATION | Oct. 30, 2015 |
| 14/928,161 | PERMANENTLY AFFIXED UN-DECRYPTABLE IDENTIFIER ASSOCIATED WITH MOBILE DEVICE | Oct. 30, 2015 |
| 14/928,498 | INTEGRATED FULL AND PARTIAL SHUTDOWN APPLICATION PROGRAMMING INTERFACE | Oct. 30, 2015 |
| 14/928,392 | TIERED IDENTIFICATION FEDERATED AUTHENTICATION NETWORK SYSTEM | Oct. 30, 2015 |

What is claimed is:

1. A system for passive based security escalation implementation, the system comprising:
   a memory device with a security application stored thereon;
   a communication device in operative communication with a communication device associated with a user device over a network; and
   a processing device operatively coupled to the memory device and the communication device, wherein the security application, when executed by the processing device, causes the processing device to:
   determine an offline period of time for the user device;
   generate a security escalation plan for the user device, wherein the security escalation plan comprises a set of rules for security during the offline period of time, wherein the set of rules for security during the offline period of time comprises rules for initiating a shutdown of one or more applications on the user device; and
   integrate, over the network, the security escalation plan into a user application on the user device, wherein the user application, when executed by a processor associated with the user device, causes the processor to implement the security escalation plan.

2. The system according to claim 1, wherein the security escalation plan further comprises a second set of rules for security before the offline period of time, wherein the second set of rules for security before the offline period of time comprises rules to increase security requirements for accessing the one or more applications on the user device based on a triggering of a time period leading up to the offline period of time.

3. The system according to claim 2, wherein the security escalation plan further comprises a third set of rules for security after the offline period of time, wherein the third set of rules for security after the offline period of time comprises rules for restoring functionality of the one or more applications on the user device based on a triggering of a time period after the offline period of time.

4. The system according to claim 3, wherein the third set of rules for security further comprise rules for restoring standard security requirements for the one or more applications on the user device.

5. The system according to claim 1, wherein determining an offline period of time for the user device is accomplished by the security application further causing the processing device to:
extract historical user data associated with a user from one or more external sources; and
identify, from the historical user data, an indication of the offline period of time for the user device, wherein the indication of the offline period of time comprises one or more events that the user is attending at a future time.

6. The system according to claim 1, wherein a user may override the shutdown of the one or more applications on the user device via security authorization.

7. A computer program product for passive based security escalation implementation, the computer program product comprising at least one non-transitory computer-readable medium having computer-readable program code portions embodied therein, the computer-readable program code portions comprising:
an executable portion configured for determining an offline period of time for a user device;
an executable portion configured for generating a security escalation plan for the user device, wherein the security escalation plan comprises a set of rules for security during the offline period of time, wherein the set of rules for security during the offline period of time comprises rules for initiating a shutdown of one or more applications on the user device;
an executable portion configured for integrating, over a network, the security escalation plan into a user application; and
an executable portion configured for implementing the security escalation plan.

8. The computer program product according to claim 7, wherein the security escalation plan further comprises a second set of rules for security before the offline period of time, wherein the second set of rules for security before the offline period of time comprises rules for increasing security requirements for accessing the one or more applications on the user device based on a triggering of a time period leading up to the offline period of time.

9. The computer program product according to claim 8, wherein the security escalation plan further comprises a third set of rules for security after the offline period of time, wherein the third set of rules for security after the offline period of time comprises rules for restoring functionality of the one or more applications on the user device based on a triggering of a time period after the offline period of time.

10. The computer program product according to claim 9, wherein the third set of rules for security further comprise rules for restoring standard security requirements for the one or more applications on the user device.

11. The computer program product according to claim 7, wherein the computer readable program code portions further comprise:
an executable portion configured for extracting historical user data associated with a user from one or more external sources; and
an executable portion configured for identifying, from the historical user data, an indication of the offline period of time for the user device, wherein the indication of the offline period of time comprises one or more events that the user is attending at a future time.

12. The computer program product according to claim 7, wherein a user may override the shutdown of the one or more applications on the user device via security authorization.

13. A computer-implemented method for passive based security escalation implementation, the method comprising:
determining an offline period of time for a user device;
generating a security escalation plan for the user device, wherein the security escalation plan comprises a set of rules for security during the offline period of time, wherein the set of rules for security during the offline period of time comprises rules for initiating a shutdown of one or more applications on the user device;
integrating, over a network, the security escalation plan into a user application; and
implementing the security escalation plan.

14. The computer-implemented method according to claim 13, wherein the security escalation plan further comprises a second set of rules for security before the offline period of time, wherein the second set of rules for security before the offline period of time comprises rules for increasing security requirements for accessing one or more applications on the user device based on a triggering of a time period leading up to the offline period of time.

15. The computer-implemented method according to claim 14, wherein the security escalation plan further comprises a third set of rules for security after the offline period of time, wherein the third set of rules for security after the offline period of time comprises rules for restoring functionality of the one or more applications on the user device based on a triggering of a time period after the offline period of time.

16. The computer-implemented method according to claim 15, wherein the third set of rules for security further comprise rules for restoring standard security requirements for the one or more applications on the user device.

17. The computer-implemented method according to claim 13, the method further comprising:
extracting historical user data associated with a user from one or more external sources; and
identifying, from the historical user data, an indication of the offline period of time for the user device, wherein the indication of the offline period of time comprises one or more events that the user is attending at a future time.

18. The computer-implemented method according to claim 13, wherein a user may override the shutdown of the one or more applications on the user device via security authorization.

* * * * *